United States Patent
Ahn et al.

(10) Patent No.: US 12,212,216 B2
(45) Date of Patent: Jan. 28, 2025

(54) MOTOR COOLING APPARATUS

(71) Applicants: Hyundai Motor Company, Seoul (KR); Kia Corporation, Seoul (KR)

(72) Inventors: Chul Min Ahn, Anyang-si (KR); Baek Yu Kim, Hwaseong-si (KR); Sung Gon Byun, Hwaseong-si (KR); Su Hyeon Maeng, Seoul (KR); Dong Hui Cheon, Hwaseong-si (KR); Sun Sung Kwon, Anyang-si (KR); Won Seok Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 450 days.

(21) Appl. No.: 17/652,588

(22) Filed: Feb. 25, 2022

(65) Prior Publication Data

US 2023/0008953 A1    Jan. 12, 2023

(30) Foreign Application Priority Data

Jul. 7, 2021   (KR) .................. 10-2021-0089252

(51) Int. Cl.
| | |
|---|---|
| H02K 9/19 | (2006.01) |
| B60L 50/51 | (2019.01) |
| H02K 1/20 | (2006.01) |
| H02K 5/20 | (2006.01) |

(52) U.S. Cl.
CPC .................. *H02K 9/19* (2013.01); *H02K 1/20* (2013.01); *H02K 5/203* (2021.01); *B60L 50/51* (2019.02)

(58) Field of Classification Search
CPC .. H02K 9/19; H02K 1/20; H02K 5/20; H02K 5/203; H02K 1/185; H02K 2205/09; B60L 50/51; B60L 2220/12; Y02T 10/64; B60K 2001/006

See application file for complete search history.

(56) References Cited

U.S. PATENT DOCUMENTS

| | | | | |
|---|---|---|---|---|
| 2009/0015081 A1* | 1/2009 | Takenaka | ............... | H02K 5/203 |
| | | | | 310/54 |
| 2019/0020231 A1* | 1/2019 | Dlala | ........................ | H02K 1/02 |
| 2020/0389064 A1* | 12/2020 | Leong | .................... | H02K 5/203 |

FOREIGN PATENT DOCUMENTS

| | | | | |
|---|---|---|---|---|
| DE | 102013105553 A1 | * | 12/2013 | ............... H02K 1/20 |
| JP | 2019080416 A | * | 5/2019 | |
| WO | WO-2015018574 A2 | * | 2/2015 | ............... H02K 1/32 |

OTHER PUBLICATIONS

English translation of JP-2019080416-A (Year: 2019).*
English translation of DE-102013105553-A1 (Year: 2013).*
English translation of WO-2015018574-A2 (Year: 2015).*

* cited by examiner

*Primary Examiner* — Tulsidas C Patel
*Assistant Examiner* — Joshua Kiel M Rodriguez
(74) *Attorney, Agent, or Firm* — Slater Matsil, LLP (57) ABSTRACT

An embodiment motor cooling apparatus includes a stator core including a plurality of metal plates made in a predetermined shape by lamination, an inlet channel formed from one side of the stator core and extending therethrough to a predetermined depth therein, a plurality of cooling channels branched from an internal end of the inlet channel and extending therefrom to either an upper side or a lower side of the stator core, and a cooling fluid supply apparatus configured to circulate cooling fluid from the inlet channel to the plurality of cooling channels.

20 Claims, 6 Drawing Sheets

MOTOR COOLING APPARATUS

CROSS-REFERENCE TO RELATED APPLICATIONS

This application claims the benefit of Korean Patent Application No. 10-2021-0089252, filed on Jul. 7, 2021, which application is hereby incorporated herein by reference.

TECHNICAL FIELD

The present disclosure relates to a motor cooling apparatus.

BACKGROUND

An eco-friendly vehicle, such as an electric vehicle, a hybrid electric vehicle, or a fuel cell vehicle, is mounted with a driving motor, such as a synchronization motor or an induction motor as a traveling driving source.

Generally, the motor is configured to include a stator part provided in a structure in which a stator coil is wound around a stator core with multiple metal plates laminated, and a rotor part provided in a structure in which a rotor core with multiple metal plates laminated is fastened to a shaft.

As the related art, to cool the stator core using cooling fluid (e.g., oil), the stator core is cooled by the indirect contact between the stator core and a cooling channel by forming the cooling channel for circulating the cooling fluid in a housing or a case coupled to the stator core, but there is a problem of not satisfying target cooling performance.

Therefore, there is a need for an optimized cooling flow path structure of being directly formed on the stator core for cooling the stator core.

The above information disclosed in this Background section is only for enhancement of understanding of the background of the disclosure and accordingly it may include information that does not form the prior art that is already known to a person of ordinary skill in the art.

SUMMARY

The present disclosure relates to a motor cooling apparatus. Particular embodiments relate to a motor cooling apparatus that forms a cooling fluid circulation flow path in a stator core of a motor such that the stator core may be easily cooled.

The present disclosure can solve problems associated with the related art, and an embodiment of the present disclosure provides a motor cooling apparatus, which forms a cooling fluid circulation flow path composed of one inlet channel configured to circulate cooling fluid, and two or more cooling channels branched from the inlet channel in a stator core of a motor such that the stator core may be easily cooled.

An embodiment of the present disclosure provides a motor cooling apparatus configured to include a stator core formed by laminating a plurality of metal plates made in a predetermined shape, an inlet channel formed from one side portion of the stator core to an internal predetermined position, a first cooling channel and a second cooling channel branched from an internal end of the inlet channel and formed to extend toward one side portion and the other side portion of the stator core, and a cooling fluid supply apparatus configured to circulate cooling fluid from the inlet channel to the first cooling channel and the second cooling channel.

In particular, the inlet channel, penetrating a protrusion formed on an outer circumference of the stator core, extends from one side of the stator core to a predetermined depth towards the other side thereof, and the first cooling channel and the second cooling channel are horizontally formed to penetrate the stator core at equal intervals in a circumferential direction of the stator core.

Preferably, a plurality of protrusions are formed on the outer diameter portion of the stator core at equal intervals in the circumferential direction thereof.

Further, a bolting hole configured to couple the stator core with multiple metal plates laminated thereon with a bolt is formed to penetrate the protrusion.

A first cooling fluid branch core formed with the internal edge end of the inlet channel of the protrusion and a branch channel configured to communicate between the first cooling channel and the second cooling channel is laminated on a middle portion of the stator core.

Preferably, the branch channel includes a plurality of first arc holes formed to penetrate the cooling fluid branch core to communicate with the first cooling channel and the second cooling channel, and a first connection hole formed to be communicable between the arc hole and the inlet channel.

A second cooling fluid branch core formed with an outlet channel communicating with the second cooling channel is laminated on the other side portion of the stator core.

Preferably, the outlet channel is composed of a plurality of second arc holes formed to penetrate the second cooling fluid branch core to communicate with the second cooling channel, a discharge via hole formed in a protrusion of the second cooling fluid branch core, and a second connection hole formed to be communicable between the second arc hole and the discharge via hole.

A cooling fluid discharge core having a structure of covering the second arc hole and the second connection hole and formed with a discharge hole communicating with the discharge via hole is laminated on an outside surface other than the second cooling fluid branch core.

Preferably, when a motor case configured to cover an outer circumferential portion of the stator core is fastened to an outside surface of the cooling fluid discharge core with the bolt, a nozzle cover configured to return the cooling fluid passing through the discharge hole to a reservoir of the cooling fluid supply apparatus is fastened together between the cooling fluid discharge core and the motor case.

Further, a motor case cover is coupled to the motor case and closely contacts with and is arranged on one side portion of the stator core.

Preferably, the motor case cover is formed with a cooling fluid supply hole connected to a discharge side of a pump of the cooling fluid supply apparatus to supply the cooling fluid to the inlet channel, and a cooling fluid discharge nozzle configured to return the cooling fluid passing through a distal end of the first cooling channel to the reservoir of the cooling fluid supply apparatus.

Through the above configuration, embodiments of the present disclosure may provide the following effects.

It is possible to form the cooling fluid circulation flow path including one inlet channel configured to circulate the cooling fluid, and two or more cooling channels horizontally branched from the inlet channel in the stator core of the motor such that the cooling fluid is supplied to the inlet channel and then horizontally branched and circulated along the two or more cooling channels, thereby easily cooling the stator core, and eventually maximizing the cooling efficiency of the motor.

It is understood that the term "automotive" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of embodiments of the disclosure are discussed infra.

BRIEF DESCRIPTION OF THE DRAWINGS

The above and other features of embodiments of the present disclosure will now be described in detail with reference to certain exemplary examples thereof illustrated in the accompanying drawings which are given herein below by way of illustration only, and thus are not limitative of the present disclosure, in which.

It should be understood that the appended drawings are not necessarily to scale, presenting a somewhat simplified representation of various preferred features illustrative of the basic principles of the disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent sections of the present disclosure throughout the several figures of the drawing.

DETAILED DESCRIPTION OF ILLUSTRATIVE EMBODIMENTS

Hereinafter, preferred exemplary embodiments of the present disclosure will be described in detail with reference to the accompanying drawings.

Figure 1:
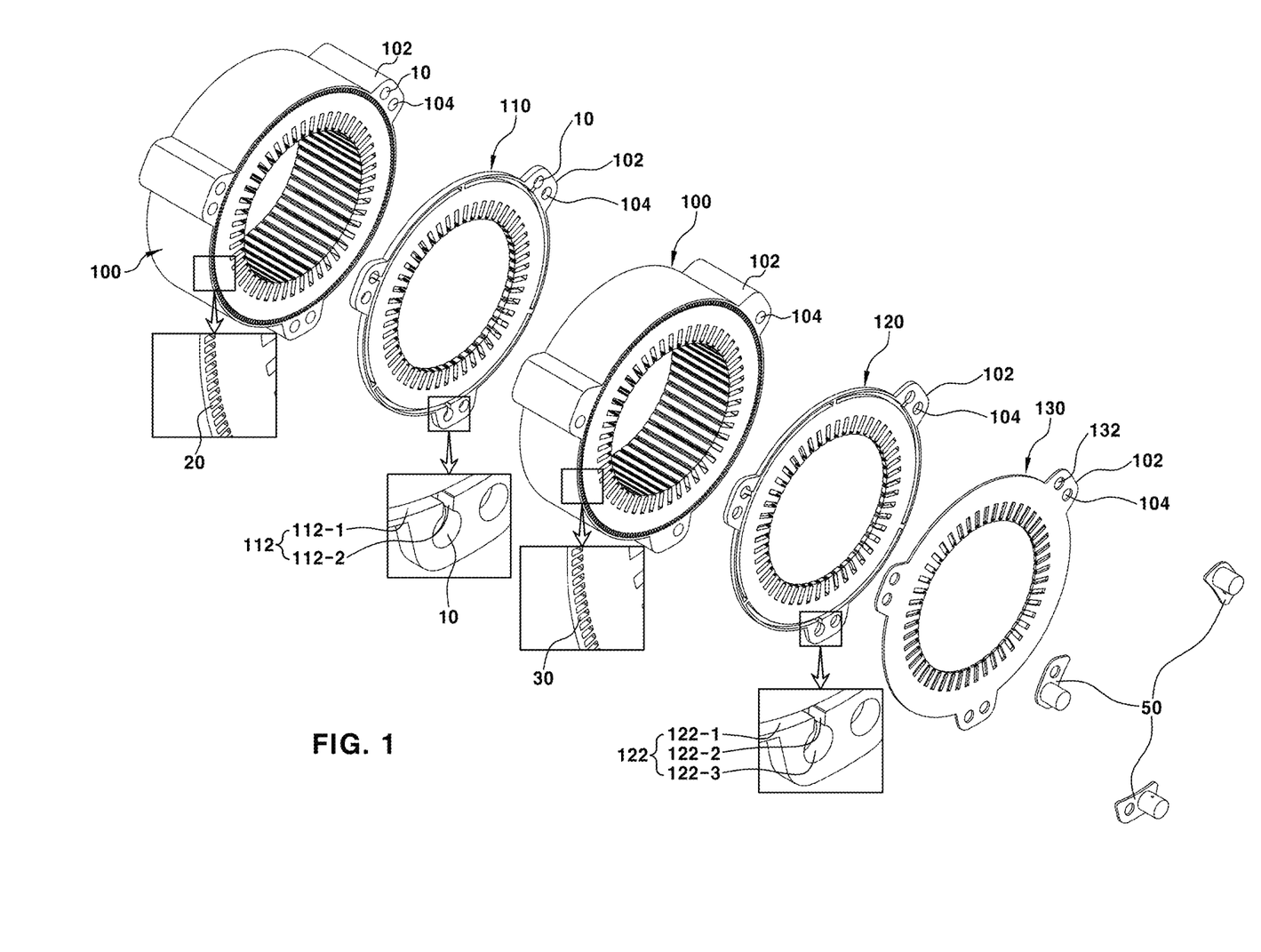
FIG. 1 is an exploded perspective diagram illustrating a stator core of a motor cooling apparatus according to embodiments of the present disclosure.
Figure 2:
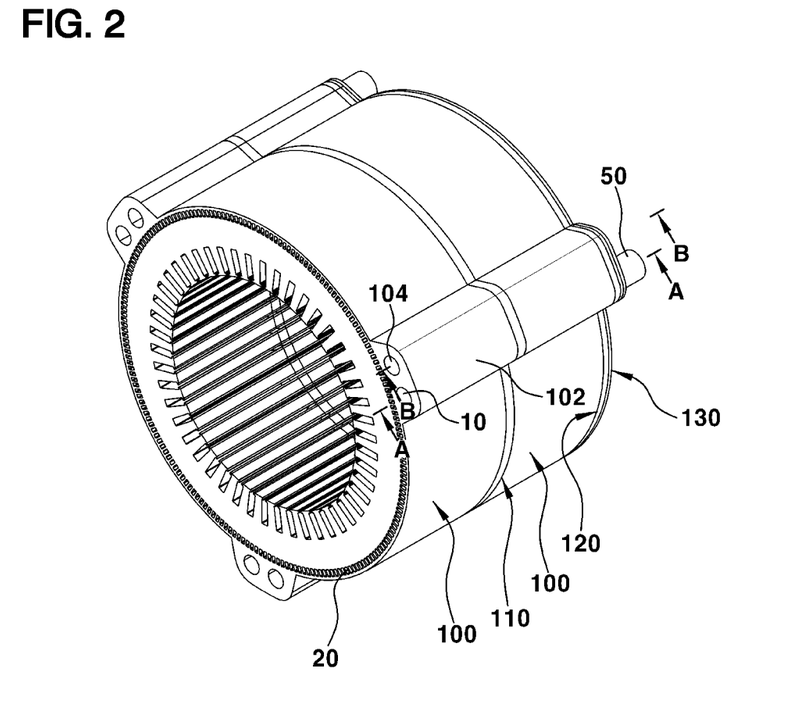
FIGS. 2 and 3 are assembly perspective diagrams illustrating the stator core of the motor cooling apparatus according to embodiments of the present disclosure.
Figure 3:
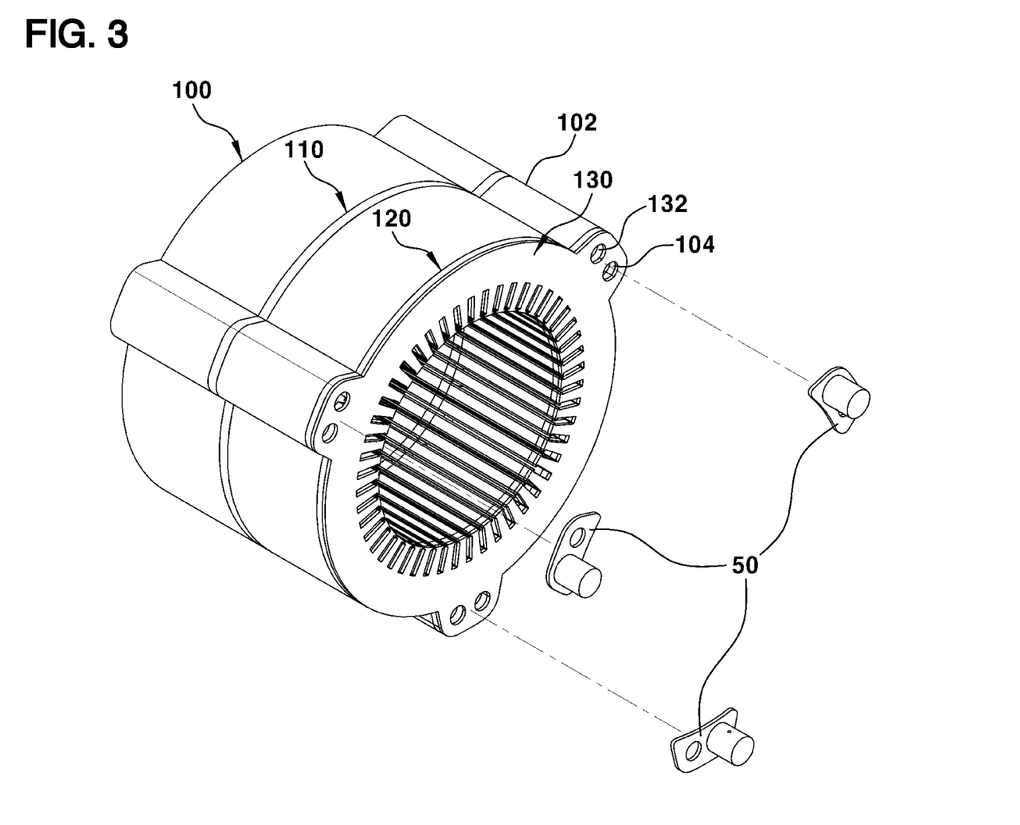
Figure 4:
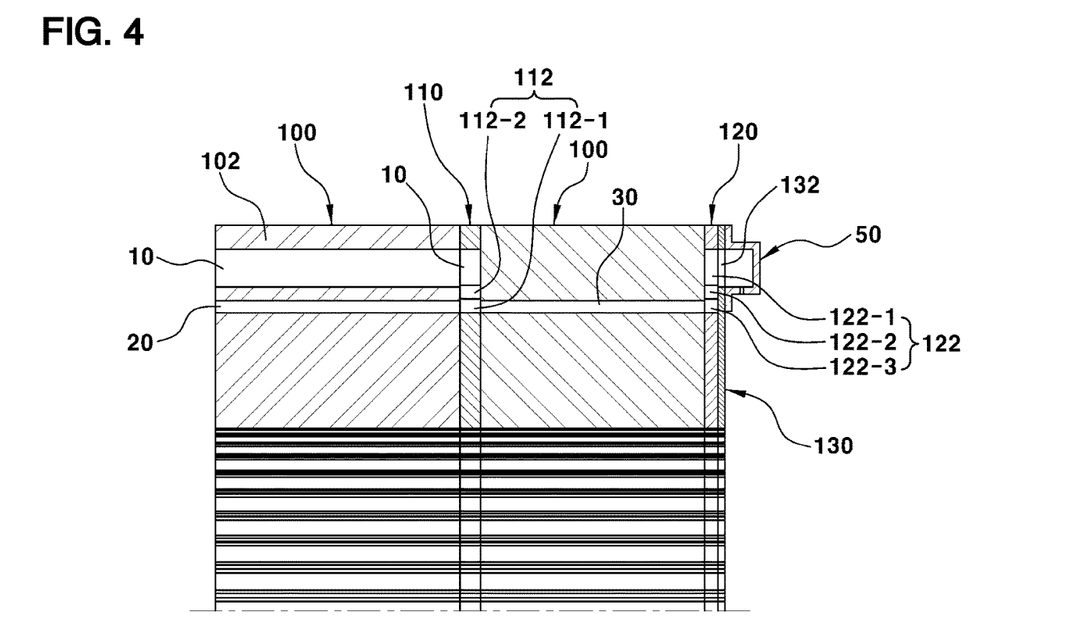
FIG. 4 is a cross-sectional diagram taken along line A-A in FIG. 2 as the motor cooling apparatus according to embodiments of the present disclosure.
Figure 5:
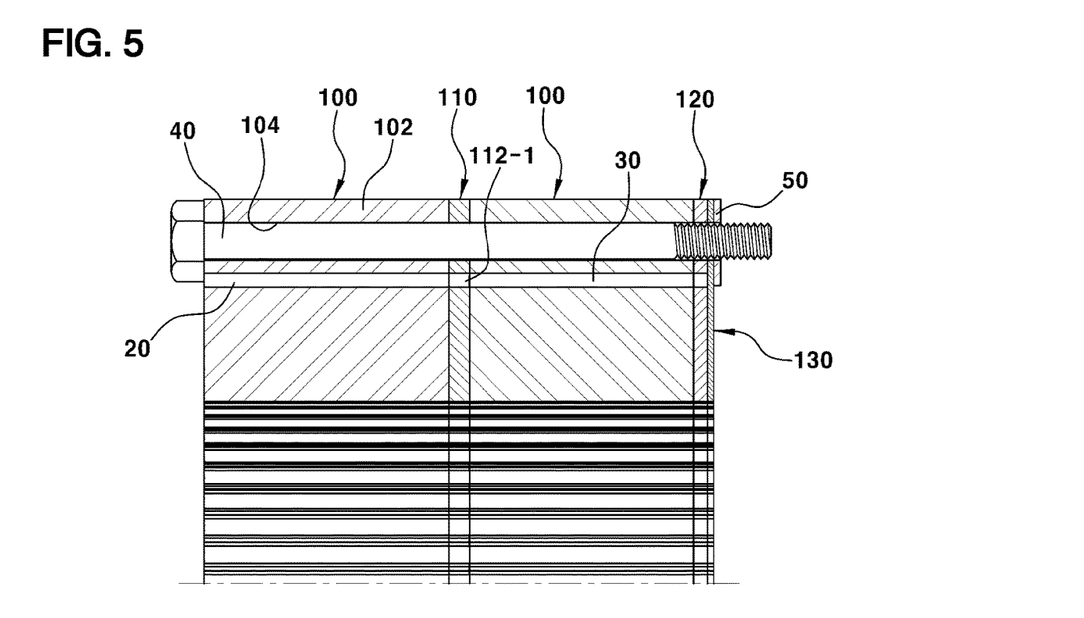
FIG. 5 is a cross-sectional diagram taken along line B-B in FIG. 2 as the motor cooling apparatus according to embodiments of the present disclosure.

FIGS. 1, 2, and 3 are perspective diagrams illustrating a stator core of a motor cooling apparatus according to embodiments of the present disclosure, and FIGS. 4 and 5 are cross-sectional diagrams taken along lines A-A and B-B in FIG. 2, respectively, in which reference numeral 100 in each drawing indicates a stator core.

The stator core 100 is one component of a motor, which is a traveling driving source for an electric vehicle or a hybrid electric vehicle, and provided in a structure of having multiple metal plates produced in a predetermined shape (e.g., a shape in which a stator coil may be wound) laminated thereon.

The stator core 100 is formed with an inlet channel 10 through which cooling fluid flows from one side portion thereof to an internal predetermined position.

Further, the stator core 100 is formed with a first cooling channel 20 and a second cooling channel 30 branched from an internal edge end of the inlet channel 10 to extend toward one side and the other side of the stator core 100.

At this time, the inlet channel 10 is connected to a pump of a cooling fluid supply apparatus, and distal ends of the first cooling channel 20 and the second cooling channel 30 are connected to reservoirs of the cooling fluid supply apparatus.

Therefore, when the pump of the cooling fluid supply apparatus is driven, the cooling fluid is supplied to the inlet channel 10, then cools the stator core while flowing into the first cooling channel 20 and the second cooling channel 30, and then circulates to be recovered to the reservoir of the cooling fluid supply apparatus.

According to embodiments of the present disclosure, since an outer diameter portion of the stator core 100 is formed with a plurality of protrusions 102 at equal intervals in a circumferential direction thereof, the inlet channel 10 is formed on the protrusions 102.

Preferably, the inlet channel 10 is formed on the protrusions 102 formed on the outer diameter portion of the stator core 100 from one side thereof toward the other side thereof at a predetermined depth.

In particular, since a first cooling fluid branch core 110 is laminated on a middle portion of the stator core 100, the stator core 100 laminated and arranged on one side around the first cooling fluid branch core 110 is formed with the first cooling channel 20, and the stator core 100 laminated and arranged on the other side therearound is formed with the second cooling channel 30.

A plurality of first cooling channels 20 and a plurality of second cooling channels 30 are horizontally formed to penetrate the stator core 100 at equal intervals in the circumferential direction of the stator core 100.

The first cooling fluid branch core 110 is provided in a structure in which a branch channel 112 configured to communicate between the internal edge portion of the inlet channel 10 of the protrusion 102 and the first cooling channel 20 and the second cooling channel 30 is formed.

More specifically, the branch channel 112 is configured to include a plurality of first arc holes 112-1 formed to penetrate the outer circumferential portion of the first cooling fluid branch core 110 to communicate with the first cooling channel 20 and the second cooling channel 30, and a first connection hole 112-2 formed to be communicable between the first arc hole 112-1 and the inlet channel 10 of the protrusion 102.

Therefore, the stator core 100 having the first cooling channel 20 formed on one side around the first cooling fluid branch core 110 is laminated, and the stator core 100 having the second cooling channel 30 formed on the other side therearound is laminated, and therefore, as illustrated in FIG. 4, the first cooling channel 20 and the second cooling channel 30 are in a state of facing the first are hole 112-1 of the first cooling fluid branch core 110 and communicating with each other.

Further, a second cooling fluid branch core 120 formed with an outlet channel 122, which communicates with the second cooling channel 30, is laminated on the other side portion of the stator core 100.

More specifically, the outlet channel 122 is configured to include a plurality of second are holes 122-1 formed to penetrate the second cooling fluid branch core 120 to communicate with the second cooling channel 30, a discharge via hole 122-3 formed in the protrusion 102 of the second cooling fluid branch core 120, and a second connection hole 122-2 formed to be communicable between the second are hole 122-1 and the discharge via hole 122-3.

Therefore, the second cooling fluid branch core 120 is laminated on the outside of the stator core 100 laminated and arranged on the other side around the first cooling fluid branch core 110, and therefore, as illustrated in FIG. 4, the second cooling channel 30 of the stator core 100 and the second are hole 122-1 of the second cooling fluid branch core 120 are in a state of facing and communicating with each other.

Further, a cooling fluid discharge core 130 is laminated on the outside surface of the second cooling fluid branch core 120.

More specifically, the cooling fluid discharge core 130 is provided in a structure of enclosing and covering the second are hole 122-1 and the second connection hole 122-2 of the second cooling fluid branch core 120, and a structure of being formed with a discharge hole 132 communicating with the discharge via hole 122-3.

At this time, the discharge hole 132 of the cooling fluid discharge core 130 is formed in the protrusion 102 of the cooling fluid discharge core 130, and therefore, as illustrated in FIG. 4, is in a state of matching with and communicating with the discharge via hole 122-3 formed in the protrusion 102 of the second cooling fluid branch core 120.

Meanwhile, a bolting hole 104 configured to couple the stator core 100 using a bolt 40 is formed to penetrate the protrusion 102.

In other words, the bolting hole 104 configured to be coupled with the stator core 100 with the bolt 40 is formed to penetrate the protrusion 102, which is formed on each of the stator core 100 having the first cooling channel 20, the first cooling fluid branch core 110, the stator core 100 having the second cooling channel 30, the second cooling fluid branch core 120, and the cooling fluid discharge core 130.

Therefore, as illustrated in FIG. 5, by inserting and fastening the bolt 40 into the bolting hole 104 of the protrusion 102, the stator core 100 having the first cooling channel 20, the first cooling fluid branch core 110, the stator core 100 having the second cooling channel 30, the second cooling fluid branch core 120, and the cooling fluid discharge core 130 are in a state of closely contacting each other and being coupled to one another.

Figure 6:
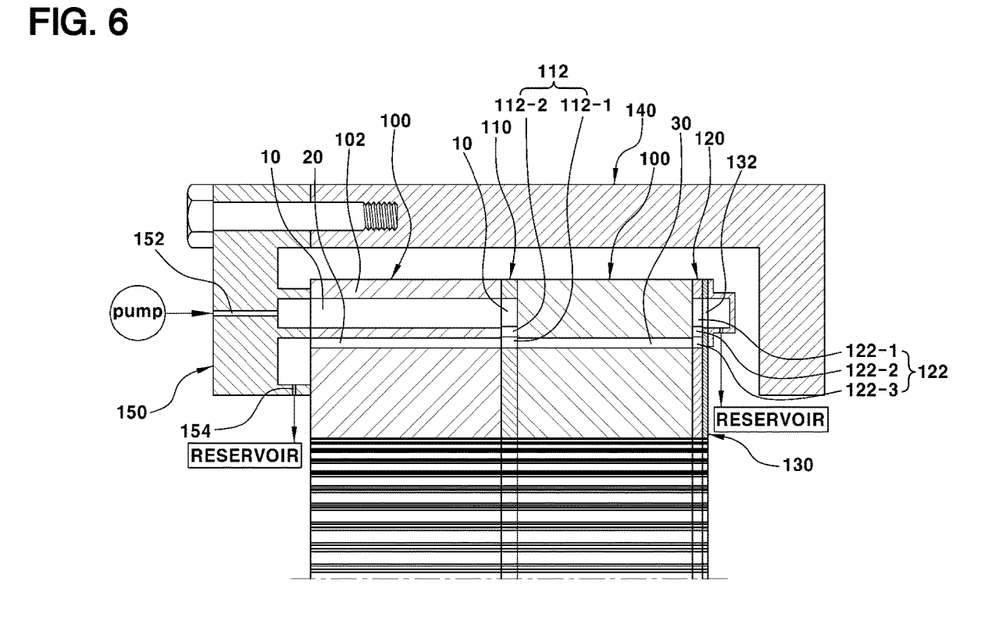
FIGS. 6 and 7 are cross-sectional diagrams illustrating a state where a motor case and a motor case cover are mounted on the stator core of the motor cooling apparatus according to embodiments of the present disclosure.
Figure 7:
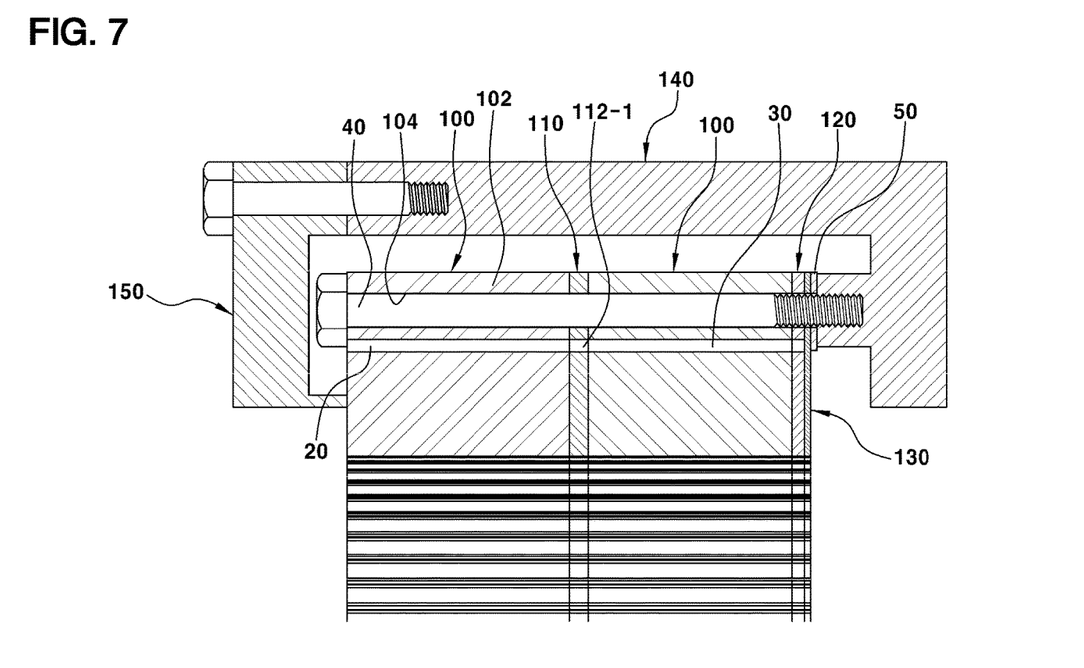

FIGS. 6 and 7 are cross-sectional diagrams illustrating a state where a motor case and a motor case cover are mounted on the stator core of the motor cooling apparatus according to embodiments of the present disclosure.

As illustrated in FIGS. 6 and 7, a motor case 140 configured to cover an outer circumferential portion of the stator core 100 is fastened to an outside surface of the cooling fluid discharge core 130 by the bolt 40 passing through the bolting hole 104 of the protrusion 102, and a motor case cover 150 is coupled to the motor case 140 with the bolt.

Further, when the motor case 140 is fastened to the outside surface of the cooling fluid discharge core 130 with the bolt 40, a nozzle cover 50 having a nozzle hole configured to return the cooling fluid passing through the discharge hole 132 to the reservoir of the cooling fluid supply device is fastened together between the cooling fluid discharge core 130 and the motor case 140 with the bolt 40.

Therefore, the cooling fluid passing through the discharge hole 132 of the cooling fluid discharge core 130 via the second cooling channel 30 of the stator core 100 may be easily returned to the reservoir through the nozzle hole of the nozzle cover 50.

Further, when the motor case cover 150 is coupled to the motor case 140 with the bolt, the motor case cover 150 is in a state of closely contacting and being arranged on one side portion of the stator core 100 having the first cooling channel 20.

At this time, as illustrated in FIG. 6, the motor case cover 150 is formed with a cooling fluid supply hole 152 connected to a discharge side of the pump of the cooling fluid supply apparatus to supply the cooling fluid to the inlet channel 10 of the protrusion 102, and a cooling fluid discharge nozzle 154 configured to return the cooling fluid passing through a distal end of the first cooling channel 20 to the reservoir of the cooling fluid supply apparatus.

Therefore, by the driving of the pump of the cooling fluid supply apparatus, the cooling fluid may be easily supplied to the inlet channel 10 of the protrusion 102 through the cooling fluid supply hole 152 of the motor case cover 150, and the cooling fluid discharged via the first cooling channel 20 of the stator core 100 may be easily returned to the reservoir through the cooling fluid discharge nozzle 154.

Here, a cooling operation of the motor cooling apparatus according to embodiments of the present disclosure having the above configuration will be described as follows.

Figure 8:
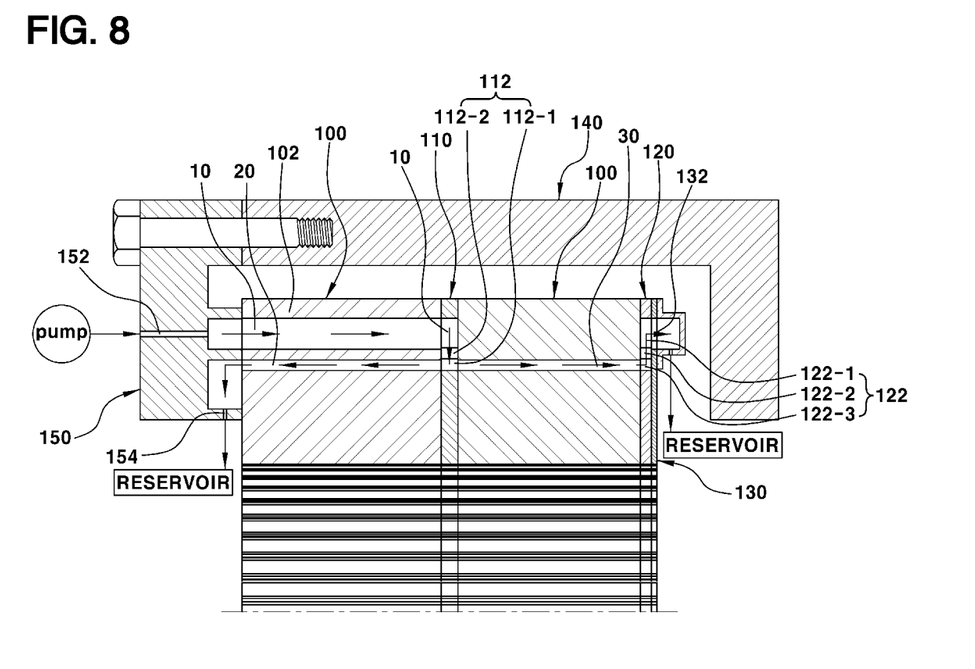
FIG. 8 is a cross-sectional diagram illustrating a state where cooling fluid is circulated in the stator core of the motor cooling apparatus according to embodiments of the present disclosure.

FIG. 8 is a cross-sectional diagram illustrating a state where the cooling fluid is circulated in the stator core of the motor cooling apparatus according to embodiments of the present disclosure.

First, the cooling fluid is supplied to the inlet channel 10 of the protrusion 102 through the cooling fluid supply hole 152 of the motor case cover 150 by driving the pump of the cooling fluid supply apparatus.

Subsequently, the cooling fluid supplied to the inlet channel 10 sequentially passes through the first connection hole 112-2 and the first are hole 112-1 of the branch channel 112 of the first cooling fluid branch core 110.

Subsequently, from the first are hole 112-1, the cooling fluid is branched to and flows into the first cooling channel 20 of the stator core 100 laminated on one side around the first cooling fluid branch core 110 and at the same time, is branched to and flows into the second cooling channel 30 of the stator core 100 laminated on the other side around the first cooling fluid branch core 110, thereby cooling the stator core.

Next, the cooling fluid discharged from the first cooling channel 20 via the first cooling channel 20 of the stator core 100 is returned to the reservoir through the cooling fluid discharge nozzle 154.

Further, the cooling fluid discharged from the second cooling channel 30 via the second cooling channel 30 of the stator core 100 sequentially passes through the second are hole 122-1 and the second connection hole 122-2 of the outlet channel 122 of the second cooling fluid branch core 120, the discharge via hole 122-3 formed in the protrusion 102 of the second cooling fluid branch core 120, and the discharge hole 132 of the cooling fluid discharge core 130, and then is returned to the reservoir through the nozzle hole of the nozzle cover 50.

As described above, the cooling fluid circulation flow path including the inlet channel 10 and the first and second cooling channels 20, 30 horizontally branched from the inlet channel 10 may be formed in the stator core 100 of the motor such that the cooling fluid is supplied to the inlet channel 10, and then branched to the left and right of the stator core 100 along the first and second cooling channels 20, 30 to be circulated, thereby easily cooling the stator core, and eventually maximizing the cooling efficiency of the motor.

What is claimed is:

1. A motor cooling apparatus comprising:
   a stator core comprising a plurality of metal plates made in a predetermined shape by lamination;
   an inlet channel formed from one side of the stator core and extending axially through the stator core to a predetermined depth therein;
   a branch channel extending radially from an internal end of the inlet channel;
   a plurality of cooling channels branched from the branch channel and extending axially therefrom to either an upper side or a lower side of the stator core; and
   a cooling fluid supply apparatus configured to circulate cooling fluid from the inlet channel to the plurality of cooling channels, wherein:
      the inlet channel extends axially through the stator core, while the branch channel extends radially from the end of the inlet channel, penetrating the stator core,
      the plurality of cooling channels are axially formed to penetrate the stator core at equal intervals in a circumferential direction, with first cooling channels extending toward a first side portion and second cooling channels extending toward a second side portion of the stator core,
      the cooling fluid supplied to the inlet channel is configured to pass through the branch channel, which is configured to communicate between the internal end of the inlet channel and the first and second cooling channels, and configured to be subsequently divided between the first cooling channel and the second cooling channel,
      the branch channel includes a plurality of first arc holes that penetrate a first cooling fluid branch core, allowing communication with the first and second cooling channels, and a first connection hole that connects the first arc holes to the inlet channel, and
      the first cooling channel and the second cooling channel are positioned facing the first arc holes of the first cooling fluid branch core.

2. The motor cooling apparatus of claim 1, further comprising a plurality of protrusions formed on an outer diameter portion of the stator core at equal intervals in the circumferential direction thereof.

3. The motor cooling apparatus of claim 1, further comprising a bolting hole penetrating a protrusion and configured to receive a bolt configured to couple the plurality of metal plates as laminated to form the stator core.

4. The motor cooling apparatus of claim 1, further comprising a second cooling fluid branch core including an outlet channel configured to communicate with the second cooling channels.

5. The motor cooling apparatus of claim 4, wherein the outlet channel comprises:
   a plurality of second arc holes penetrating the second cooling fluid branch core and configured to communicate with the second cooling channels;
   a discharge via hole formed in a protrusion of the second cooling fluid branch core; and
   a second connection hole configured to be communicable between the second arc hole and the discharge via hole.

6. The motor cooling apparatus of claim 5, further comprising a cooling fluid discharge core disposed on an outside surface other than the second cooling fluid branch core and having a structure that covers the second arc holes and the second connection hole, wherein the cooling fluid discharge core includes a discharge hole configured to communicate with the discharge via hole.

7. The motor cooling apparatus of claim 6, further comprising:
   a motor case fastened to an outside surface of the cooling fluid discharge core with a bolt and covering an outer circumferential portion of the stator core; and
   a nozzle cover fastened between the cooling fluid discharge core and the motor case and configured to return the cooling fluid passing through the discharge hole to a reservoir of the cooling fluid supply apparatus.

8. A motor cooling apparatus comprising:
   a stator core comprising a plurality of metal plates made in a predetermined shape by lamination;
   an inlet channel formed from one side of the stator core and extending axially therethrough to a predetermined depth therein, wherein the inlet channel penetrates a protrusion formed on an outer circumference of the stator core and extends from an upper side of the stator core to the predetermined depth towards a lower side of the stator core;
   a branch channel radially extending from an internal end of the inlet channel and penetrating the stator core;
   a plurality of cooling channels axially branched from the branch channel and extending therefrom to either the upper side or the lower side of the stator core, wherein the plurality of cooling channels are axially formed to penetrate the stator core at equal intervals in a circumferential direction of the stator core, and the plurality of cooling channels comprises a plurality of first cooling channels extending toward a first side portion of the stator core and a plurality of second cooling channels extending toward a second side portion of the stator core;
   a first cooling fluid branch core laminated at a middle portion of the stator core, providing the branch channel configured to communicate between the internal end of the inlet channel and the plurality of first cooling channels and the plurality of second cooling channels;
   a second cooling fluid branch core including an outlet channel configured to communicate with the plurality of second cooling channels laminated on the second side portion of the stator core; and
   a cooling fluid supply apparatus configured to circulate cooling fluid from the inlet channel to the plurality of cooling channels, wherein:
      the branch channel includes a plurality of first arc holes that penetrate the first cooling fluid branch core to communicate with the plurality of first cooling channels and the plurality of second cooling channels, and a first connection hole that connects the first arc holes with the inlet channel,
      the cooling fluid supplied to the inlet channel is configured to pass through the branch channel and is configured to be subsequently divided into a first cooling channel of the plurality of first cooling channels and a second cooling channel of the plurality of second cooling channels, and the first cooling channel and the second cooling channel are positioned facing the first arc holes of the first cooling fluid branch core.

9. The motor cooling apparatus of claim 8, wherein the outlet channel comprises:
   a plurality of second arc holes penetrating the second cooling fluid branch core and configured to communicate with the plurality of second cooling channels;
   a discharge via hole formed in a protrusion of the second cooling fluid branch core; and
   a second connection hole configured to be communicable between the second arc hole and the discharge via hole.

10. The motor cooling apparatus of claim 9, further comprising a cooling fluid discharge core laminated on an outside surface other than the second cooling fluid branch core and having a structure that covers the second arc holes and the second connection hole, wherein the cooling fluid discharge core includes a discharge hole configured to communicate with the discharge via hole.

11. The motor cooling apparatus of claim 10, further comprising:
   a motor case fastened to an outside surface of the cooling fluid discharge core with a bolt and covering an outer circumferential portion of the stator core; and
   a nozzle cover fastened between the cooling fluid discharge core and the motor case and configured to return the cooling fluid passing through the discharge hole to a reservoir of the cooling fluid supply apparatus.

12. The motor cooling apparatus of claim 11, further comprising a motor case cover coupled to the motor case and arranged in close contact with the first side portion or the second side portion of the stator core.

13. The motor cooling apparatus of claim 12, wherein the motor case cover comprises:
   a cooling fluid supply hole connected to a discharge side of a pump of the cooling fluid supply apparatus configured to supply the cooling fluid to the inlet channel; and
   a cooling fluid discharge nozzle configured to return the cooling fluid passing through a distal end of the first cooling channel to the reservoir of the cooling fluid supply apparatus.

14. A method of forming a motor cooling apparatus, the method comprising:
   laminating a plurality of metal plates made in a predetermined shape to form a stator core;
   forming an inlet channel extending axially from one side of the state core through a protrusion on an outer circumference of the stator core and extending from an upper side of the stator core to a predetermined depth towards a lower side of the stator core;
   forming a branch channel extending radially from an internal end of the inlet channel and penetrating the stator core;
   forming a plurality of cooling channels axially branched from the branch channel and extending therefrom to either the upper side or the lower side of the stator core, wherein the plurality of cooling channels are axially formed to penetrate the stator core at equal intervals in a circumferential direction of the stator core and the plurality of cooling channels comprises a plurality of first cooling channels formed to extend toward a first side portion of the stator core and a plurality of second cooling channels formed to extend toward a second side portion of the stator core;
   laminating a first cooling fluid branch core at a middle portion of the stator core to provide the branch channel configured to communicate between the internal end of the inlet channel and the plurality of first cooling channels and the plurality of second cooling channels;
   configuring the branch channel to include a plurality of first arc holes penetrating the first cooling fluid branch core and communicating with the plurality of first cooling channels and the plurality of second cooling channels, and forming a first connection hole to connect the first arc holes with the inlet channel; and
   configuring a cooling fluid supply apparatus to circulate cooling fluid from the inlet channel to the plurality of cooling channels, wherein:
      the cooling fluid supplied to the inlet channel is configured to pass through the branch channel and is configured to be subsequently divided into a first cooling channel of the plurality of first cooling channels and the second cooling channel of the plurality of second cooling channels, and
      the cooling fluid supplied to the inlet channel is configured to pass through the branch channel and is configured to be subsequently divided into the first cooling channel and the second cooling channel.

15. The method of claim 14, further comprising forming a plurality of protrusions on an outer diameter portion of the stator core at equal intervals in the circumferential direction thereof.

16. The method of claim 14, further comprising inserting a bolt into a bolting hole penetrating the protrusion to couple the laminated plurality of metal plates to form the stator core.

17. The method of claim 14, further comprising laminating a second cooling fluid branch core on the second side portion of the stator core, the second cooling fluid branch including an outlet channel to communicate with the second cooling channel, wherein the outlet channel comprises:
   a plurality of second arc holes penetrating the second cooling fluid branch core and communicating with the second cooling channel;
   a discharge via hole formed in a protrusion of the second cooling fluid branch core; and
   a second connection hole communicable between the second arc hole and the discharge via hole.

18. The method of claim 17, further comprising laminating a cooling fluid discharge core on an outside surface other than the second cooling fluid branch core, the cooling fluid discharge core covering the second arc holes and the second connection hole, wherein the cooling fluid discharge core includes a discharge hole to communicate with the discharge via hole.

19. The method of claim 18, further comprising:
   fastening a motor case to an outside surface of the cooling fluid discharge core with a bolt and covering an outer circumferential portion of the stator core; and
   fastening a nozzle cover between the cooling fluid discharge core and the motor case, wherein the nozzle cover returns the cooling fluid passing through the discharge hole to a reservoir of the cooling fluid supply apparatus.

20. The method of claim 19, further comprising coupling a motor case cover to the motor case, wherein the motor cover is arranged in close contact with the first side portion or the second side portion of the stator core, and wherein the motor case cover comprises:

a cooling fluid supply hole connected to a discharge side of a pump of the cooling fluid supply apparatus to supply the cooling fluid to the inlet channel; and a cooling fluid discharge nozzle to return the cooling fluid passing through a distal end of the first cooling channel to the reservoir of the cooling fluid supply apparatus.

* * * * *